Patented Sept. 23, 1924.

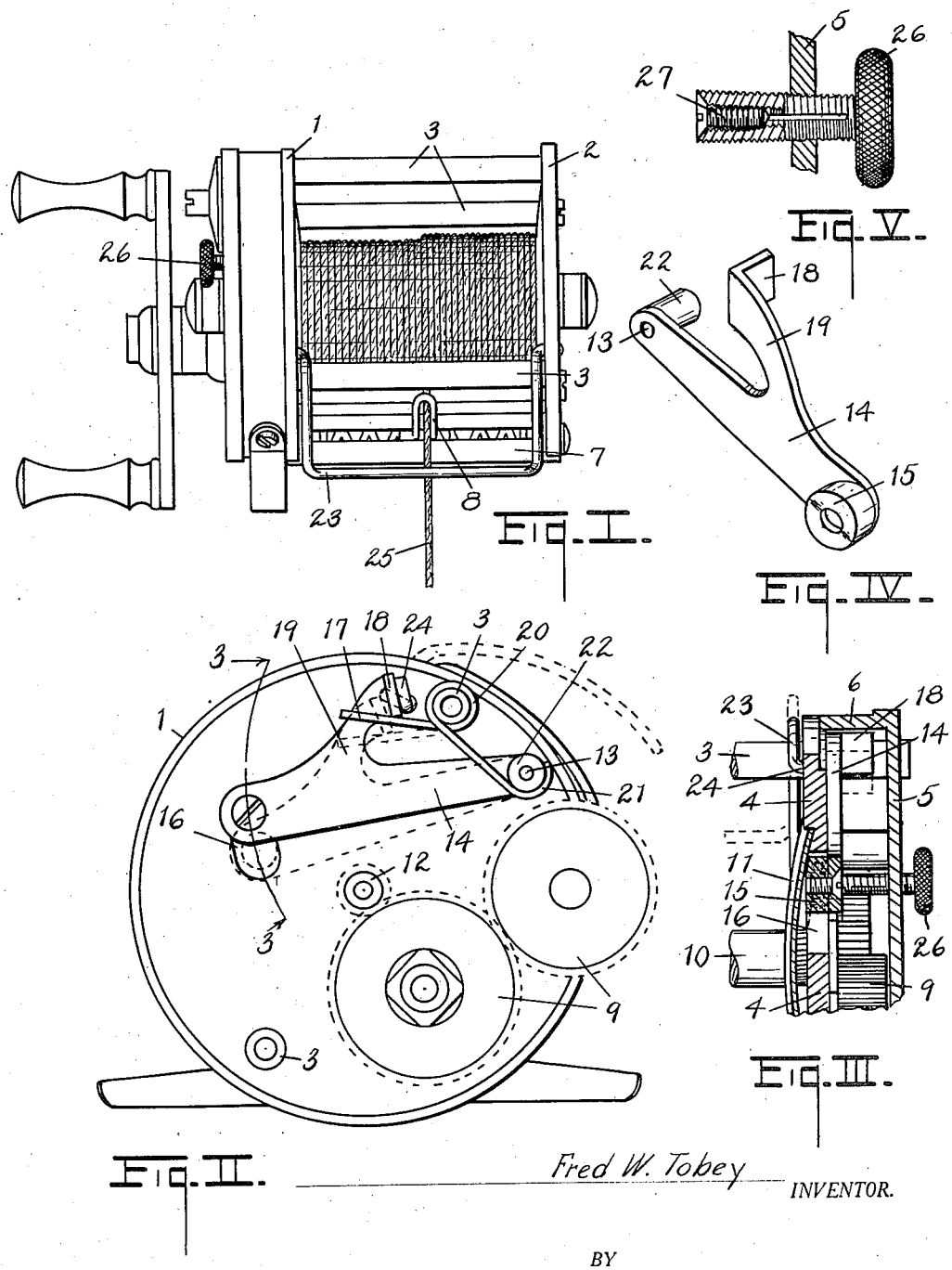

1,509,324

UNITED STATES PATENT OFFICE.

FRED W. TOBEY, OF GRAND RAPIDS, MICHIGAN.

FISHLINE REEL.

Application filed July 30, 1923. Serial No. 654,620.

*To all whom it may concern:*

Be it known that I, FRED W. TOBEY, a citizen of the United States, residing at Grand Rapids, county of Kent, State of Michigan, have invented certain new and useful Improvements in Fishline Reels, of which the following is a specification.

This invention relates to improvements in fishline reels.

The main objects of the invention are:

First, to provide in a fish line reel an improved brake device which automatically acts upon the spool when the line is free from tension, thereby preventing "back lash" or back winding of the reel.

Second, to provide an improved fish line reel of the antibacklash type having a brake member normally held in braking or engaging position by means of a spring, the parts being arranged so that a very light spring is effective.

Third, to provide an improved antibacklash reel mechanism which is very sensitive in its action and at the same time the parts are strong and durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a plan view of a fishing reel embodying the features of my invention.

Fig. II is an end view with the outer head member removed, the brake lever being shown in full lines in normal position and by dotted lines in actuated position.

Fig. III is an enlarged detail section on a line corresponding to line 3—3 of Fig. II.

Fig. IV is a front perspective view of the brake member.

Fig. V is a side view of the brake abutment or thrust screw.

In the drawing similar reference characters refer to similar parts throughout the several views.

Referring to the drawing, I provide a frame comprising a head member 1 and tail member 2 connected by suitable pillars 3. The head member is made up of an inner plate 4 and an outer plate 5, the outer plate being provided with a peripheral flange 6 abutting the inner plate, thereby providing a chamber. The reel illustrated is of the level wind type, the level wind mechanism being designated generally by the numeral 7, it having an elongated line guide 8. The driving gears 9 for the level winding mechanism are arranged in the chambered head. The spool 10 is provided with concaved flanges 11, the flanges being disposed on the inside of the tail member 2 and the head plate 4. The journal of the spool projects through the head plate 4 and is provided with a gear indicated at 12 coacting with one of the driving gears 9.

Pivotally mounted within the head at 13, the pivot 13 being disposed adjacent the front of the frame, is a relatively long brake member 14, this brake member being disposed so that it projects rearwardly above and beyond the axis of the spool, as is clearly shown in Fig. II. On the side of the swinging end of this lever is a brake shoe 15, the shoe projecting through a slot 16 provided therefor in the inner head plate, so that the shoe coacts with the inside of the spool flange, the engaging movement of the shoe being in general in the direction of rotation of the spool when the line is running out.

The stress on the brake member is largely toward its pivot so that there is a "snubbing" action in the engagement which is very effective and requires but very little pressure to cause effective engagement and consequently but little power to release the brake. The brake is urged to engaging position and is held normally in engaging position by means of the spring 17 which engages the inturned lug 18 on the end of the upwardly projecting arm 19 of the brake member. The spring 17 is provided with a coil 20 which engages the end of one of the pillars 3, one end of the spring engaging the lug 18 and the other being hooked at 21 to engage the hub 22 of the brake member. The brake is actuated to disengaging position by means of the bail-like brake lever 23 which is journaled in the frame and is provided with a short arm 24 which rests against the lug 18, so that when this brake lever is raised, as by tension on the line 25, the brake is released, allowing the spool to run free. However, as the tension on the line is slackened, as by the dropping of a bait into the water or movements of a fish, the brake automatically engages, thus preventing overrunning of the spool and consequently tangling or "back lashing" of the line.

The outer or swinging end of the brake member 14 is supported laterally by the thrust screw 26 threaded for adjustment into the outer head plate 5. The inner end of this thrust or abutment screw is tapped to receive the locking screw 27, the purpose being to expand the screw 26, thereby locking it in its adjusted positions. This arrangement permits of a relatively long brake member which may be made of light material without danger of its springing or vibrating when engaging and disengaging. When the line is wound in the brake is automatically disengaged. As stated, this arrangement permits the use of a light spring so that while the parts are strong and durable they are very sensitive in action.

Having thus described my invention, what I claim as new and desire to secure by Letters Patent, is:

1. In a fish line reel, the combination with the reel frame comprising a head member including inner and outer plates, the inner plate being slotted, of a spool provided with an outwardly facing concaved flange, a relatively long lever-like brake member pivoted between said head plates adjacent the forward side thereof to project rearwardly beyond the axis of the spool and provided with a brake shoe disposed through said slot to engage within said flange of the reel, said brake member being provided with a centrally disposed upwardly projecting arm terminating in an outwardly turned lug, a thrust screw threaded into said outer head member to coact with the swinging end of said brake member, a spring mounted in said head to engage the lower edge of said lug whereby the brake lever is urged to engaging position, and a bail-like brake lever journaled in said frame to extend across the front thereof and provided with an arm engaging the said lug on said brake member whereby when said lever is lifted as by the line the brake is released.

2. In a fish line reel, the combination with the reel frame comprising a head member including inner and outer plates, the inner plate being slotted, of a spool provided with an outwardly facing concaved flange, a relatively long lever-like brake member pivoted between said head plates adjacent the forward side thereof to project rearwardly beyond the axis of the spool and provided with a brake shoe disposed through said slot to engage within said flange of the reel, said brake member being provided with a centrally disposed upwardly projecting arm terminating in an outwardly turned lug, a spring mounted in said head to engage the lower edge of said lug whereby the brake lever is urged to engaging position, and a bail-like lever journaled in said frame to extend across the front thereof and provided with an arm engaging the said lug on said brake member whereby when said lever is lifted as by the line the brake is released.

3. In a fish line reel, the combination with the reel frame of a spool provided with a concaved flange, a brake member pivoted on said frame to project rearwardly of the axis of the spool and provided with a brake shoe adapted to engage within said flange, said brake member being provided with an upwardly projecting arm, an adjustable thrust member coacting with the swinging end of said brake member, a spring arranged to urge said brake member to engaging position, and a brake lever journaled in said frame to extend across the front thereof and provided with an arm engaging the said arm on said brake member whereby the brake is released by tension on the line.

4. In a fish line reel, the combination with the reel frame, of a spool provided with a concaved flange, a brake member pivoted on said frame to project rearwardly of the axis of the spool and provided with a brake shoe adapted to engage within said flange, said brake member being provided with an upwardly projecting arm, a spring arranged to urge said brake member to engaging position, and a brake lever journaled in said frame to extend across the front thereof and provided with an arm engaging the said arm on said brake member whereby the brake is released by tension on the line.

5. In a fish line reel, the combination with the reel frame, of a spool provided with a flange, a brake member pivoted on said frame to project rearwardly of the axis of the spool and provided with a brake shoe adapted to engage within said flange with a movement in the direction of the rotation of the spool when the line is running therefrom, an adjustable thrust member coacting with the swinging end of said brake member, a spring arranged to urge said brake member to engaging position, and a brake lever journaled in said frame to be engaged by the line running from the spool and operatively associated with said brake, whereby the brake is released by tension on the line.

6. In a fish line reel, the combination with the reel frame, of a spool provided with a flange, a brake member pivoted on said frame to project rearwardly of the axis of the spool and provided with a brake shoe adapted to engage within said flange with a movement in the direction of the rotation of the spool when the line is running therefrom, a spring arranged to urge said brake member to engaging position, and a brake lever journaled in said frame to be engaged by the line running from the spool and operatively associated with said brake whereby the brake is released by tension on the line.

7. In a fish line reel, the combination with the reel frame, of a spool provided with a flange, a brake member pivoted on said frame to project rearwardly of the axis of the spool and provided with a brake shoe adapted to engage within said flange, an adjustable thrust member coacting with the swinging end of said brake member, a spring arranged to urge said brake member to engaging position, and a brake lever journaled in said frame to be engaged by the line running from the spool and operatively associated with said brake whereby the brake is released by tension on the line.

8. In a fish line reel, the combination with the frame, of a spool provided with a flange, a brake member pivotally mounted on said frame to swing in a plane transverse to the axis of the spool and so that its engaging movement is in the direction of rotation of the spool when the line is running therefrom, a thrust member threaded for adjustment coacting with the swinging end of said brake member supporting it laterally when in braking engagement with the reel, and a brake lever adapted to be actuated by the fish line and operatively associated with said brake member.

9. In a fish line reel, the combination with the frame, of a spool provided with a flange, a brake member pivotally mounted on said frame to swing in a plane transverse to the axis of the spool, a thrust member threaded for adjustment coacting with the swinging end of said brake member supporting it laterally when in braking engagement with the reel, and a brake lever adapted to be actuated by the fish line and operatively associated with said brake member.

10. In a fish line reel, the combination with the frame, of a spool provided with a flange, a brake member pivotally mounted on said frame to swing in a plane transverse to the axis of the spool and so that its engaging movement is in the direction of rotation of the spool when the line is running therefrom, and a brake lever adapted to be actuated by the fish line and operatively associated with said brake member.

In witness whereof I have hereunto set my hand and seal.

FRED W. TOBEY. [L. S.]